US005482359A

United States Patent [19]
Breen

[11] Patent Number: 5,482,359
[45] Date of Patent: Jan. 9, 1996

[54] SYSTEM AND METHOD FOR DETERMINING RELATIVE VEHICLE MASS

[75] Inventor: Michael T. Breen, Garden City, Mich.

[73] Assignee: Eaton Corporation, Cleveland, Ohio

[21] Appl. No.: 232,716

[22] Filed: Apr. 22, 1994

[51] Int. Cl.$^6$ ....................................... B60T 8/18
[52] U.S. Cl. ........................ 303/9.69; 303/7; 303/22.1; 303/DIG. 2
[58] Field of Search ................... 303/9.69, 22.1, 303/7, 22.2, 22.8, 20, DIG. 1–4; 188/3 R, 181 T

[56] References Cited

U.S. PATENT DOCUMENTS

| | | | |
|---|---|---|---|
| 4,402,047 | 8/1983 | Newton et al. | 303/20 X |
| 4,712,839 | 12/1987 | Brearley et al. | 303/22.1 X |
| 4,822,113 | 4/1989 | Amberg et al. | 303/DIG. 2 X |
| 5,382,085 | 1/1995 | Zbinden | 303/DIG. 3 X |

Primary Examiner—Robert J. Oberleitner
Assistant Examiner—Peter M. Poon
Attorney, Agent, or Firm—Brooks & Kushman

[57] ABSTRACT

A system and method for determining vehicle mass relative to a previous mass of the same vehicle utilizes a closed-loop control system to bring the vehicle to a controlled deceleration upon initiation of the procedure. The relative mass of the vehicle is determined by sensing the applied braking pressures at each of the vehicle axles and processing that information to generate the total braking force being applied to the wheels of the vehicle. Since a greater mass requires a greater braking force to achieve the same deceleration, the necessary braking force is indicative of the relative vehicle mass. An appropriate braking mode such as work balance, proportioning, or ABS, can then be determined based on the relative vehicle mass to better control subsequent braking maneuvers.

11 Claims, 5 Drawing Sheets

5,482,359

SYSTEM AND METHOD FOR DETERMINING RELATIVE VEHICLE MASS

TECHNICAL FIELD

The present invention relates to a system and method for determining relative vehicle mass during controlled braking.

BACKGROUND ART

The continuing evolution of microprocessor control has enabled more comprehensive and complex vehicle control strategies. As is well known, an electronic control unit (ECU) utilizing a microprocessor is often employed to control a variety of functions for all types of vehicles, including heavy-duty tractor-semitrailer trucks. The ECU receives inputs from strategically located sensors indicating various vehicle operating parameters. This information is then processed by a predetermined set of instructions which also determines which outputs to energize to effect control of the vehicle.

The accuracy of any control system, including vehicle control systems, depends on a number of variables including the thoroughness and accuracy of the information obtained from the input sensors. Of course, the ECU can effect more sophisticated control if provided with more accurate and complete data. However, the economic considerations imposed by large-scale manufacturing of vehicles, limits the number of sensors and the accuracy of the sensors utilized in such applications.

Therefore, it is desirable to combine data obtained from various existing sensors and use that data to approximate other vehicle parameters which are difficult to measure directly or not critical to vehicle control, thereby eliminating the need for an additional sensor. One parameter which is difficult to economically measure directly, but used in controlling commercial vehicles such as heavy-duty tractor semitrailer trucks, is the vehicle mass. More precisely, the current vehicle mass relative to a prior vehicle mass. The mass of a vehicle such as a tractor-semitrailer truck may vary significantly depending upon whether the trailer is loaded, unloaded, or disconnected from the tractor.

The relative vehicle mass is an important parameter which may be used in vehicle control, especially for control of vehicle braking in tractor-semitrailer trucks. Braking systems for such vehicles are difficult to design since the load, which often varies substantially, affects braking performance. For example, the braking system must effectively operate when the vehicle is a tractor only, a tractor with an empty or lightly loaded trailer, or a tractor with a heavily loaded trailer. Thus, the relative vehicle mass is one of several vehicle operating parameters which may be used to select an appropriate braking mode of operation, such as work balance, proportioning, or ABS.

It would therefore be desirable to provide a method and system for determining relative vehicle mass. Once the relative vehicle mass is known, a particular braking mode can be selected so that the ECU can control the applied braking force delivered to each of the vehicle braking sites based on the known relative vehicle mass. Thus, it is unnecessary for the vehicle operator to compensate for a larger vehicle mass by applying greater pressure to the brake pedal, since the vehicle braking control system will automatically adjust the delivered braking force for the current vehicle loading condition. As a result, more precise braking is effected.

SUMMARY OF THE INVENTION

It is, therefore, an object of the present invention to provide a system for determining relative vehicle mass during controlled braking.

It is an additional object of the present invention to provide a system for determining relative vehicle mass during controlled braking which incorporates standard sensors typically found on vehicles equipped with electronically controlled braking systems.

Another object of the present invention is to provide a system for determining the relative vehicle mass during controlled braking and determining the appropriate braking mode of operation based upon the vehicle operating parameters including the relative vehicle mass.

Yet another object of the present invention is to provide a system which can modify delivered braking force depending upon the relative vehicle mass so that vehicle braking performance is consistent across wide variations in vehicle mass.

In carrying out the above object and other objects and features of the present invention, a system is provided for determining relative vehicle mass during controlled braking comprising means for decelerating the vehicle at a predetermined rate during the controlled braking maneuver, means for sampling the braking pressure delivered to the vehicle braking sites, means for determining the vehicle mass relative to a previously determined vehicle mass, and means for controlling vehicle braking during subsequent braking maneuvers based on the relative vehicle mass. A method is also provided for use with the system.

The above objects and other objects, features, and advantages of the present invention will be readily appreciated by one of ordinary skill in the art from the following detailed description of the best mode for carrying out the invention when taken in connection with the accompanying drawings.

BEST MODE FOR CARRYING OUT THE INVENTION

Figure 1:
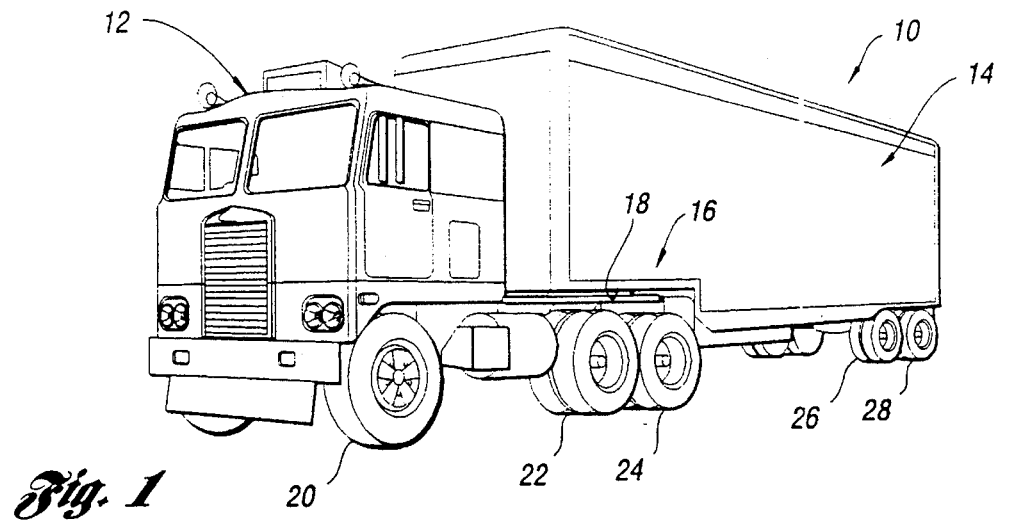
FIG. 1 is a diagrammatic representation of a tractor-semitrailer vehicle of the system for determining relative vehicle mass of the present invention.

Referring now to FIG. 1, there is shown a typical tractor-semitrailer vehicle 10, which is well known in the art. The vehicle comprises a tractor 12 and a semitrailer 14 pivotally attached by a connecting means. The connecting means includes a king pin 16 (best shown in FIG. 3) fixed to the semitrailer 14 and selectively engaged to a fifth wheel 18 (also shown in FIG. 2) which is fixed to the tractor 12, as is also well known in the art. The tractor 12 typically includes a non-driven front steer axle 20 and a pair or tandem set of rear drive axles 22, 24. The trailer 14 typically includes a pair or tandem set of non-steerable, non-driven trailer axles 26, 28. Of course, the tractor could include a single drive axle or multiple drive axles. Similarly the trailer could include a single axle or multiple axles which are steerable, non-steerable, driven, or non-driven.

Figure 2:
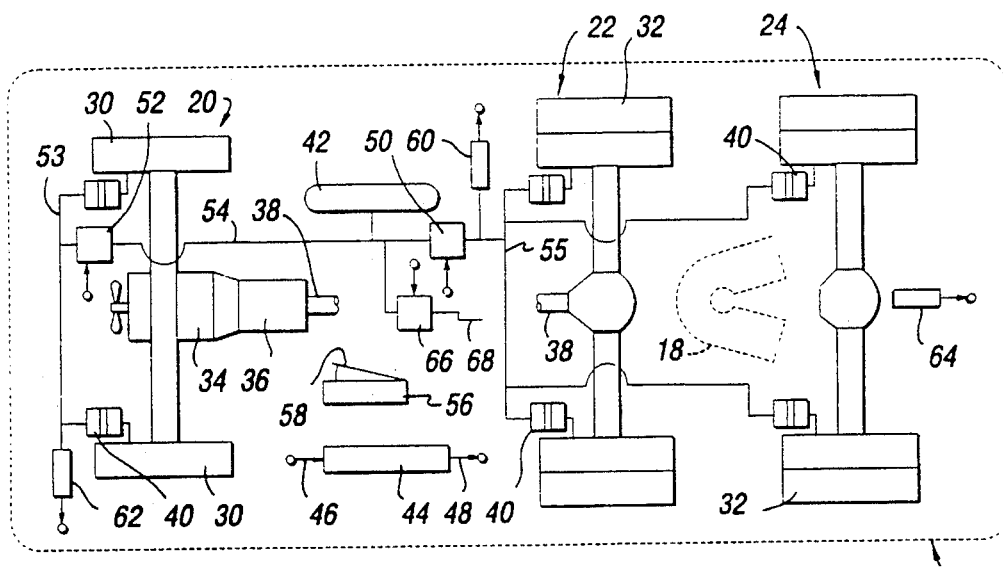
FIG. 2 is a schematic illustration of the brake control system mounted on the tractor of the vehicle of FIG. 1 of the system for determining relative vehicle mass of the present invention.

Referring now to FIG. 2, there is shown a braking system, which is mounted on the tractor 12 of the vehicle 10 of FIG. 1, which incorporates the system and which carries out the method for determining relative vehicle mass of the present invention. Typically, the steer axle 20 of the tractor 12 includes a pair of associated wheels 30. The tractor tandem drive axles 22, 24 typically have four associated drive wheels 32 for each axle. The tractor tandem drive axles 22, 24 are driven by the engine 34 through the transmission 36 and driveline 38.

As also shown in FIG. 2, the tractor 12 includes air actuated brake chambers 40 for retarding the rotation of their associated wheels 30, 32. Each air actuated brake chamber 40 corresponds to an individual brake site. In the preferred embodiment, the brake sites corresponding to a particular axle or tandem axle exhibit similar braking characteristics. Typically, however, the brake sites at different axles exhibit different braking characteristics corresponding to their relative load during a braking operation and the physical characteristics of the brake itself. For example, the brake sites associated with the steer axle 20 would respond differently to the same delivered braking pressure than the brake sites associated with the tandem drive axles 22,24. The number of brake sites associated with a particular applied braking pressure is an important parameter utilized in determining the relative vehicle mass as explained below. Although the preferred embodiment of the present invention is utilized on a commercial vehicle employing an air-actuated braking system, the method could also easily be applied to various other types of vehicles employing analogous braking systems, such as a hydraulic braking system.

With continuing reference to FIG. 2, compressed air for actuating the brakes is supplied from a plurality of supply tanks 42, only one of which is shown. The supply tanks 42 are provided with compressed air from a vehicle compressor, (not specifically shown) or the like. The braking system also includes an electronic control unit (ECU) 44, which is preferably a microprocessor based control unit with memory having means for receiving a plurality of input signals 46. The ECU 44 processes the input signals by a set of predetermined logic rules and includes means for generating and delivering output signals 48 to various system actuators, such as pressure control valves 50, 52, to effect control of the system. The actual connections between the ECU 44, the sensors, and the actuators are not shown for the sake of clarity.

Still referring to FIG. 2, a drive axle pressure control valve 50, connected to compressed air supply tank 42 via supply line 54 controls the air pressure delivered to the brake chambers 40 associated with the tandem drive axles 22, 24 based on control signals from the ECU 44, and generally independent of the air pressure in the supply line 54. The regulated air pressure is delivered to the appropriate brake chambers 40 via the drive axle air supply line 55. The control signals from ECU 44 are generated in response to at least a signal received from the brake pedal sensor 56 when the vehicle operator indicates a request for vehicle braking by depressing the brake pedal 58. The signal generated by brake pedal sensor 56 varies in value and, for example, is proportional to the pressure exerted upon, or the displacement of brake pedal 58.

The supply tanks 42 are also in fluid communication with the steer axle brake control valve 52 via supply line 54 for regulating the pressure delivered via the steer axle air supply line 53 to the brake chambers 40. In a similar fashion, trailer brake control valve 66 is connected to supply tanks via supply line 54. The trailer brake control valve 66 receives a trailer braking signal from the ECU 44 and responds by regulating a pilot pressure in tractor pilot supply line 68, independent of the pressure in supply line 54.

As also shown in FIG. 2, a drive axle pressure transducer 60 provides a signal to the ECU 44 indicative of the air pressure delivered to the brake chambers 40 associated with the tandem drive axles 22, 24. In a similar fashion, a steer axle pressure transducer 62 monitors the air pressure delivered to the braking chambers 40 associated with the steer axle 20. Preferably, the tractor 12 includes means for sensing the acceleration or deceleration of the vehicle, such as an accelerometer 64, as is well known in the art. Of course the vehicle acceleration or deceleration may be detected by monitoring the rate of change of the vehicle speed or velocity. The accelerometer 64 and the pressure transducers 60, 62 communicate with the ECU 44 via the input means 46.

Figure 3:
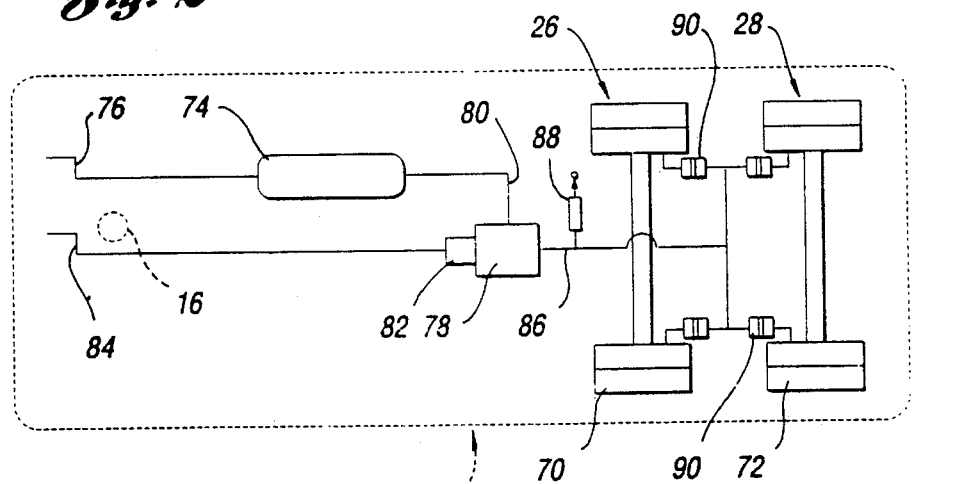
FIG. 3 is a schematic illustration of a brake control system mounted on the trailer of the vehicle of FIG. 1 of the system for determining relative vehicle mass of the present invention.

Referring now to FIG. 3, there is shown a brake control system mounted on the trailer 14 of the vehicle 10 of FIG. 1, of the system for determining relative vehicle mass of the present invention. As already noted, the trailer 14 preferably includes a kingpin 16 for selective engagement and disengagement to the tractor fifth wheel 18, as is well known in the art. The trailer 14 also preferably includes a set of tandem trailer axles 26, 28 each having associated dual trailer wheels 70, 72.

As also shown in FIG. 3, the trailer 14 includes a pressurized air supply tank 74 which is selectively engageable with the tractor air system by means of a fluid connection 76, and is also connected to the inlet port of a pressure relay valve 78 via fluid connecting means 80. The pressure relay valve 78 includes a pilot portion 82 which is connected to the trailer pilot supply line 84. The trailer pilot supply line 84 is selectively engageable with the tractor pilot supply line 68. The pressure relay valve 78 controls the pressure in the trailer brake line 86 based on the pressure in the trailer pilot supply line 84, independent of the pressure in the connecting means 80 of supply tank 74.

As also shown in FIG. 3, the trailer brake pressure is monitored by trailer pressure transducer 88 which communicates with the ECU 44 via input means 46. The trailer brake line 86 delivers braking pressure to the trailer brake chambers 90 with each brake chamber corresponding to a trailer braking site. Typically, all of the trailer brakes are controlled at substantially the same pressure since they are all connected to the output port of the pressure relay valve 78. Thus, it is desirable for all of the trailer brakes to exhibit similar braking characteristics.

Figure 4:
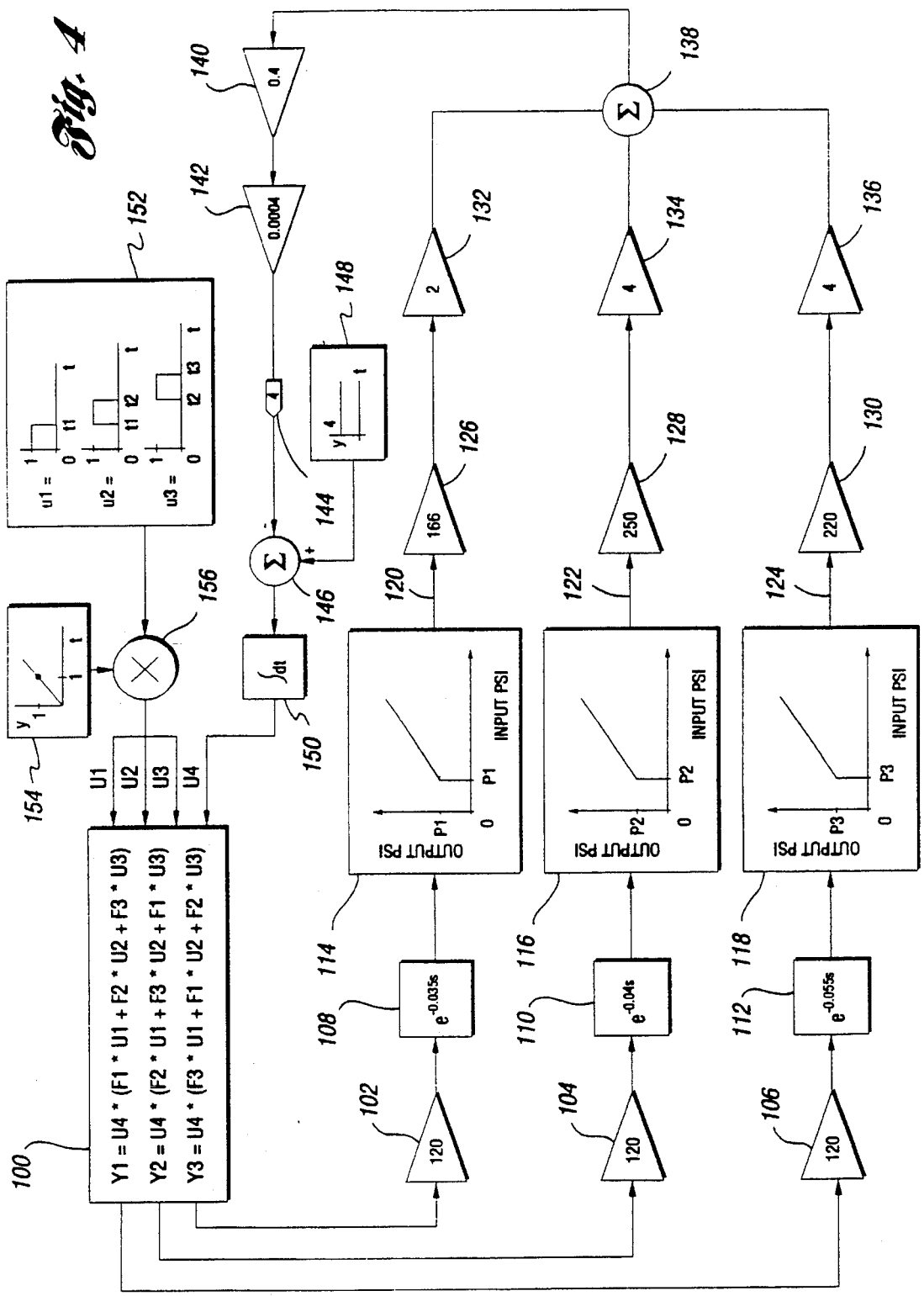
FIG. 4 is a block diagram illustrating the operation of the measurement system and the vehicle for which relative vehicle mass is to be determined according to the present invention.

In FIG. 4, a block diagram illustrating the operation of the system for determining relative vehicle mass including the vehicle braking system of the present invention is shown. Such diagrams are produced by a number of commercially available control system design software packages, such as MATRIX-X®. The system illustrated is also used to determine the relative brake factors, which indicate relative braking performance, as disclosed in U.S. Pat. No. 5,415, 466, titled "System and Method of Determining Relative Brake Factors", assigned to the assignee of the present invention, the specification of which is hereby incorporated by reference in its entirety. Estimation of the relative vehicle mass involves estimation of the relative brake factors, as explained in greater detail below.

As shown in FIG. 4, the system for estimating relative vehicle mass is a closed-loop control system. The computations shown throughout are preferably performed by the ECU 44. Each equation shown in block 100 represents a vehicle axle (or set of tandem axles) with a substantially different braking characteristic. Thus, as the vehicle shown includes three such axles, one term of each equation is associated with the steer axle 20, another term is associated with the tandem drive axles 22, 24, and the third term is associated with the tandem trailer axles 26, 28. Of course the system could be easily adapted to a vehicle having more or less than three axles, or sites with different braking characteristics. In that case, the number of equations would be the number of independently controlled brake sites with each axle or different brake site having an associated term in each control equation.

The block 100 of FIG. 4, generates values for control variables Y1, Y2, and Y3 which respectively correspond to the tandem trailer axles 26, 28; tandem drive axles 22, 24; and the steer axle 20. The control variables have a value between zero and unity, inclusive, based upon the inputs, U1 through U4, and the proportioning factors, F1 through F3. The proportioning factors represent a division of the total braking force among the various axles or characteristic braking sites and are chosen such that the sum of the proportioning factors is unity.

Still referring to FIG. 4, blocks 102 through 142 represent the brake characteristics of the steer, drive, and trailer axles, as well as the wheel radius and mass of the tractor semi-trailer. The control values are multiplied by an associated scaling factor at gain blocks 102, 104, and 106. In a preferred embodiment of the present invention, all the scaling factors have a value of "120" which represents the normal system supply pressure in pounds per square inch of the air supply tanks 42, 74. Of course, the various supply tanks could have different pressures in which case the appropriate scaling factors would be adjusted accordingly. Each output of the gain blocks is multiplied by its respective time delay factor at time delay blocks 108, 110, and 112. Time delay block 108 is an exponential function with a time constant, the value of which is representative of the inherent delay between actual and commanded pressure introduced by the steer axle air supply line 53. Similarly, time delay block 110 has a time constant, the value of which is representative of the delay due to the drive axle air supply line 55. Likewise, time delay block 112 has a time constant, the value of which is representative of the delay due to the trailer axle air supply line 86.

As also shown in FIG. 4, the outputs of time delay blocks 108, 110, 112 are connected to blocks 114, 116, and 118, respectively, which contain a transfer function representative of the "crack pressure" (P1, P2, P3) of pressure control valves 52, 50, and 78 associated with the various vehicle axles. The transfer functions are obtained by plotting the output pressure of each valve as a function of valve input pressure. Thus, the output pressure is near zero until the input pressure exceeds the crack pressure, at which time the valve opens and the output pressure follows the input pressure.

The output of block 114 shown at 120 represents the actual braking pressure applied to the braking sites at the steer axle 20 which is measured by steer axle pressure transducer 62. Similarly, outputs 122 and 124 represent the actual braking pressure applied to the braking sites at the tandem drive axles and tandem trailer axles, respectively, which are measured by the corresponding pressure transducers 60, 88. The braking pressures are then multiplied by the corresponding relative brake factors at blocks 126, 128, and 130. The brake factors are essentially conversion factors which transform braking pressure into brake torque.

With continuing reference to FIG. 4, the outputs of blocks 126, 128, and 130 are then multiplied by their corresponding number of brake sites at each axle at blocks 132, 134, and 136, respectively. In a preferred embodiment, the steer axle has two (2) brake sites and the tandem drive axles and tandem trailer axles each have four (4) brake sites. The outputs of blocks 132, 134, and 136 are then summed at block 138. Thus, the output of block 138 represents the total amount of braking torque being applied to the wheels of the vehicle. This total braking torque is multiplied by the reciprocal of the vehicle wheel radius at block 140 to produce the total braking force applied to decelerate the vehicle. The total braking force is then multiplied by the reciprocal of the previous mass of the vehicle at block 142 to generate the vehicle deceleration.

Still referring to FIG. 4, the output of block 142, shown by reference numeral 144, is subtracted from a predetermined reference deceleration value at block 146 to generate an error signal. Output 144 corresponds to the actual deceleration signal as measured by accelerometer 64. The reference deceleration value is represented by block 148. The error signal is integrated with respect to time at block 150 and the result is supplied to the computation block 100 as input U4, thus closing the control loop.

As also shown in FIG. 4, the other inputs (U1, U2, and U3) to block 100 provide a time base represented by blocks 152 and 154, the outputs of which are multiplied at block 156. Thus, the variable U1 ramps from time "0" to time $t_1$, whereas variable U2 ramps from time $t_1$ to time $t_2$, and variable U3 ramps from time $t_2$ to time $t_3$.

Figure 5A:
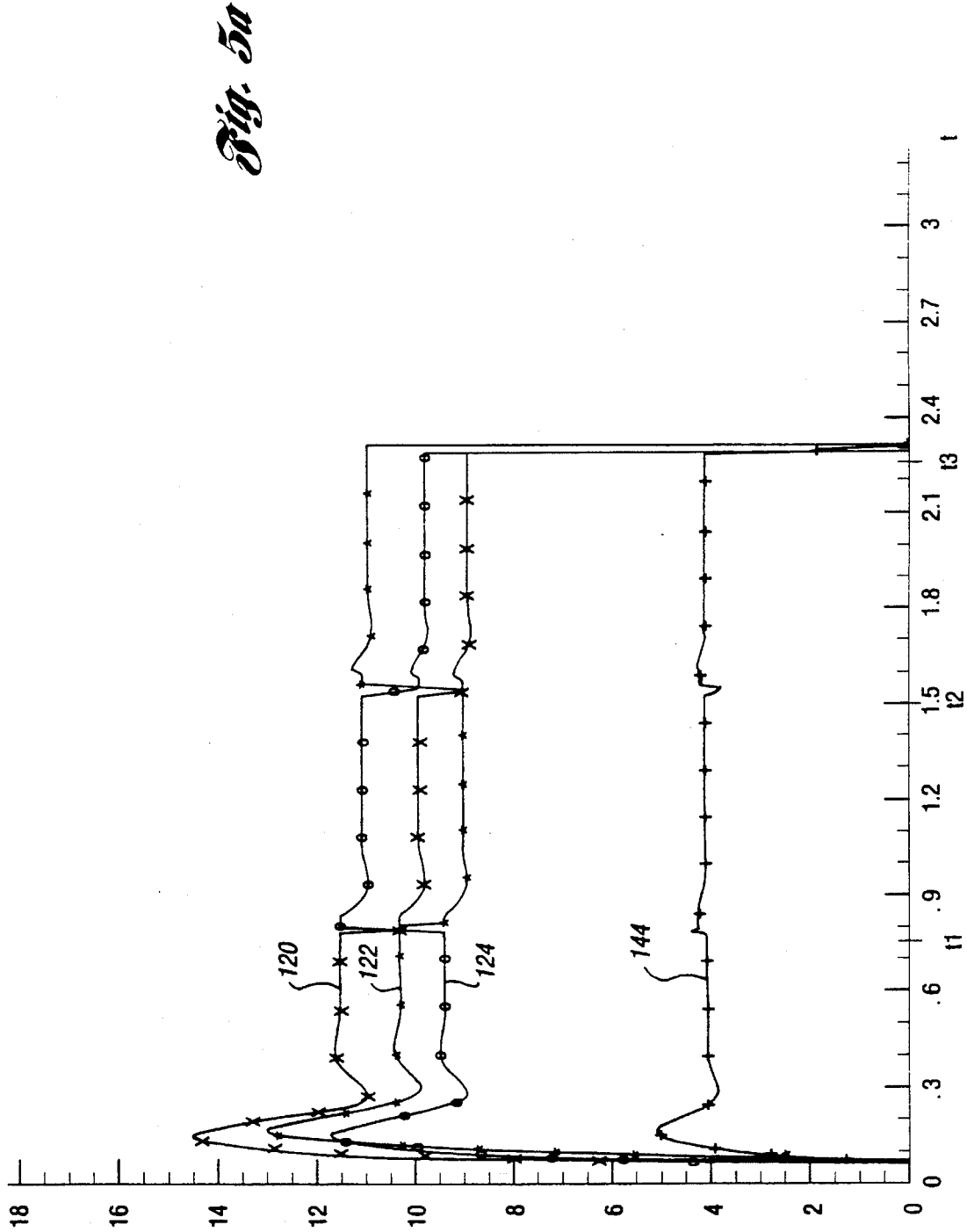
FIG. 5a is a graphical representation of the delivered braking pressures and vehicle deceleration for a particular vehicle mass of a vehicle utilizing the system and method of the present invention.
Figure 5B:
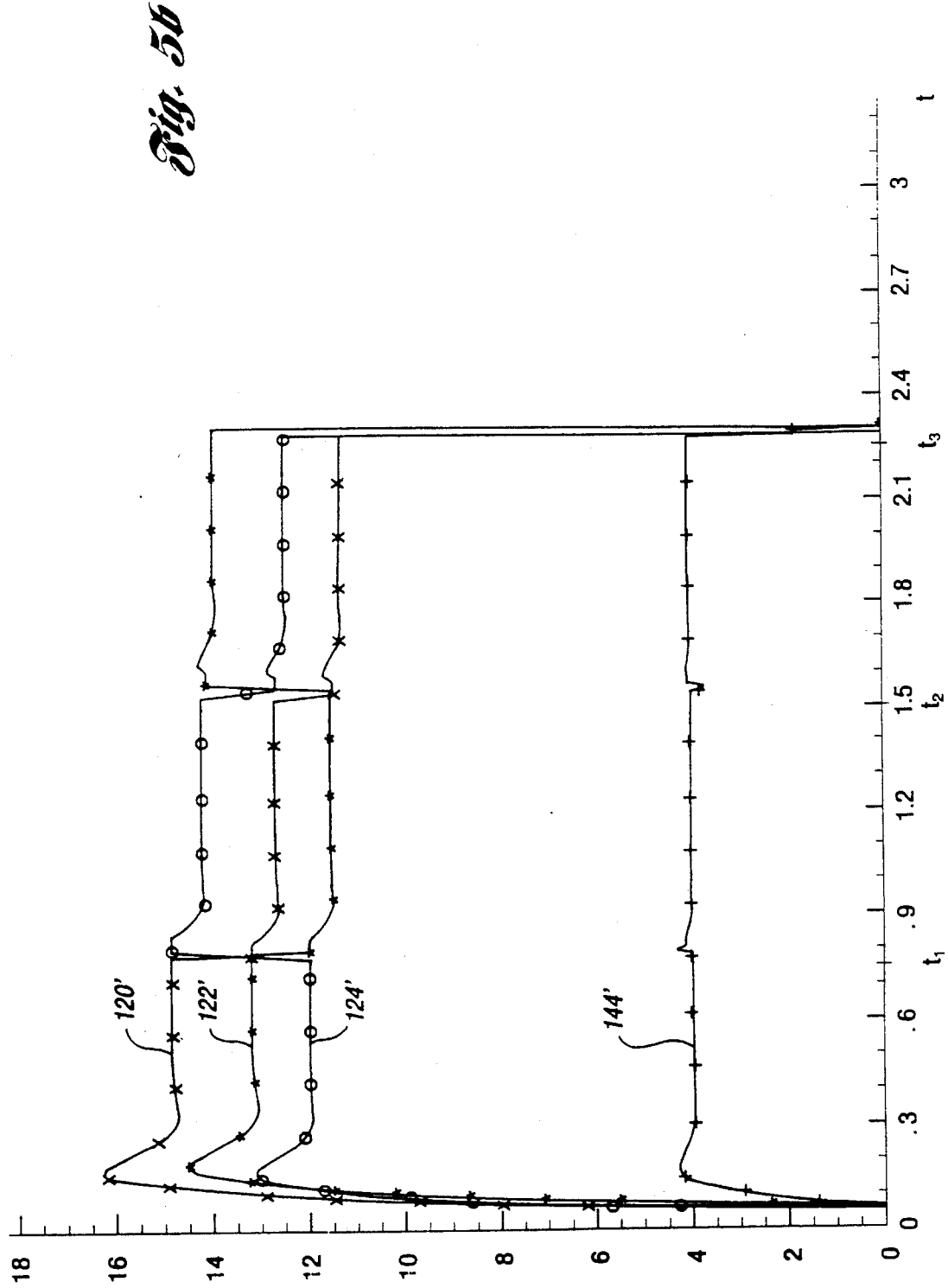
FIG. 5b is a graphical representation of the delivered braking pressures and vehicle deceleration for the vehicle of FIG. 5a, but with a greater vehicle mass, which illustrates the operation of the system and method of the present invention.

FIGS. 5a and 5b, provide graphical representations of the delivered braking pressures and vehicle deceleration for two particular vehicle masses of the same vehicle during a controlled braking event. In operation, the vehicle operator initiates a test sequence when the vehicle is travelling on a substantially level, dry surface. The vehicle is automatically decelerated to the controlled reference rate, which is measured by accelerometer 64, for a predetermined time interval. The closed-loop control system illustrated in FIG. 4 will modify the applied braking pressures so that the actual vehicle deceleration will be approximately equal to the reference deceleration rate.

Preferably, the relative vehicle mass is determined during the first 750 milliseconds of a brake factor estimation test as indicated by $t_1$ in FIGS. 5a and 5b. During this time period, the delivered braking pressures at each of the steer, drive, and trailer axles are monitored by the corresponding pressure transducers 60, 62, and 88, as illustrated in FIG. 5a by lines 120, 122, and 124, respectively. The calculated vehicle deceleration is also plotted as indicated by line 144. Once the braking pressures have reached their steady-state values, which is approximately 300 milliseconds after initiation of the test in a preferred embodiment, the inverse of the relative vehicle mass, stored in block 142 of FIG. 4, may be ascertained. Of course, the relative vehicle mass determination may be performed or repeated during the second and third time intervals of the brake factor estimation test, indicated by $t_2$ and $t_3$, respectively, as well. The first value of the inverse vehicle mass determined by block 142 serves as a reference value to which future values are compared thereby determining whether the vehicle mass is greater than, or less than, its previous value.

FIG. 5b illustrates the applied braking pressures and vehicle deceleration for the same vehicle as FIG. 5a, but with a greater mass. As shown in FIG. 5b, the increased vehicle mass requires a greater applied braking pressure to attain the same vehicle deceleration. Once the relative vehicle mass has been ascertained, this information is used by the controller in addition to various other operating parameters, such as wheel speeds and engine speed, to select the proper braking mode of operation for future vehicle braking.

Figure 6:
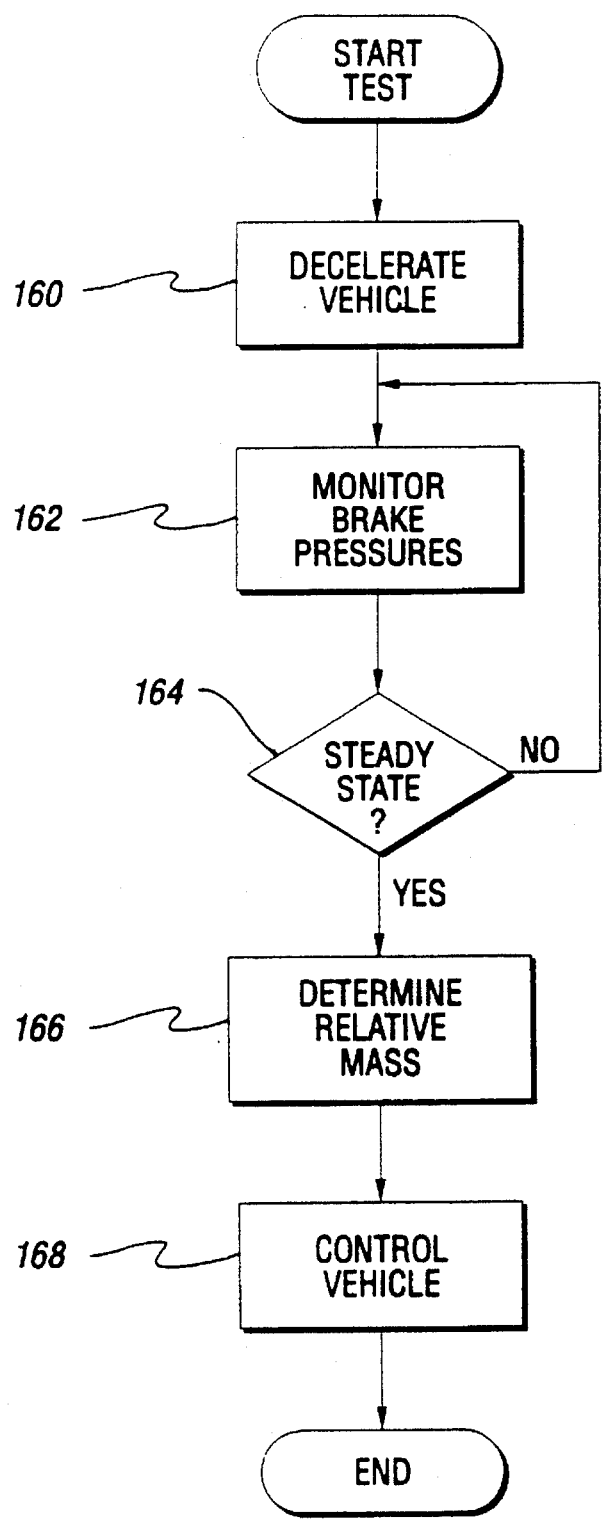
FIG. 6 is a flowchart illustrating the method for determining relative vehicle mass of the present invention.

Referring now to FIG. 6, a flowchart illustrating the method for determining relative vehicle mass of the present invention is shown. The operator initiates the sequence illustrated when conditions are appropriate for a brief controlled braking maneuver, such as when travelling on a dry, approximately level surface. At step 160, the vehicle is automatically decelerated to a known reference deceleration rate. Preferably, the reference deceleration rate is chosen so that wheel slip does not occur. In a preferred embodiment, the reference deceleration rate is 4 ft/s². At step 162, the applied braking pressures at each of the vehicle axles are monitored to detect the braking force necessary to bring the vehicle to the reference deceleration rate.

As also shown in FIG. 6, at step 164, a test is performed to determine whether steady-state values have been reached. This test may consist of pausing for a predetermined time period, the length of which depends upon the response time and settling time of the particular vehicle braking system. Alternatively, step 164 may consist of pausing until the change in applied braking pressure at each site is near zero, which allows for some noise in the signals from the pressure transducers, before proceeding to the next step. Once the pressures have reached their steady-state values, the relative vehicle mass is determined at step 166 by the system illustrated in FIG. 4 and described in detail above. At step 168, the vehicle is controlled based on the relative vehicle mass determined in step 166. The step of controlling the vehicle may include selecting an appropriate braking mode of operation such as work balance, proportioning, or ABS, and modifying the vehicle braking based on the selected braking mode of operation.

It is understood, of course, that while the form of the invention herein shown and described constitutes a preferred embodiment of the invention, it is not intended to illustrate all possible forms thereof. It will also be understood that the words used are descriptive rather than limiting, and that various changes may be made without departing from the spirit and scope of the invention disclosed.

What is claimed is:

1. For use with a vehicle including an electronic control unit with memory and a plurality of axles, each axle with an associated plurality of braking sites controlled by the electronic control unit, a system for determining a relative vehicle mass during a controlled braking maneuver for the purpose of braking control during subsequent braking maneuvers, the system comprising:

means for decelerating the vehicle at a predetermined rate during the controlled braking maneuver, the means for decelerating delivering a braking pressure to each of the braking sites on at least one of the axles;

means for sampling the braking pressure delivered to the braking sites on the at least one of the axles to obtain at least one braking pressure signal;

means for determining the vehicle mass relative to a previously determined vehicle mass based on the at least one braking pressure signal; and means for controlling vehicle braking during subsequent braking maneuvers based on the relative vehicle mass.

2. The system of claim 1 wherein the vehicle includes a plurality of wheels and wherein the means for decelerating the vehicle comprises:

a sensor in communication with the electronic control unit for sensing the rate of change in velocity of the vehicle; and an air-pressure-actuated braking system for retarding rotation of at least two of the plurality of wheels in response to control signals from the electronic control unit.

3. The system of claim 2 wherein the means for sampling comprises at least one pressure transducer in communication with the electronic control unit, the at least one pressure transducer generating a signal having a value proportional to the braking pressure being delivered to each of the braking sites on the at least one axle.

4. The system of claim 1 wherein the means for determining the vehicle mass comprises:

means for determining an estimated vehicle deceleration based on the at least one braking pressure signal and the previously determined vehicle mass;

means for sensing vehicle deceleration to obtain an actual vehicle deceleration signal;

means for comparing the estimated vehicle deceleration to the actual vehicle deceleration signal so as to generate an error signal;

means for modifying at least one of the braking pressures so as to reduce the error signal;

means for repeating the above two steps until the error signal is less than a predetermined value so as to obtain a steady-state estimated vehicle deceleration; and means for generating the vehicle mass based on the steady-state vehicle deceleration and the at least one braking pressure.

5. The system of claim 4 wherein the means for sensing vehicle deceleration comprises an accelerometer.

6. The system of claim 4 wherein the means for determining an estimated vehicle deceleration comprises:

means for determining braking torques exerted by the plurality of braking sites located at each of the plurality of vehicle axles;

means for summing the braking torques exerted on each vehicle axle to generate a total vehicle braking torque;

means for processing the total vehicle braking torque to determine a vehicle braking force; and means for multiplying the vehicle braking force by the reciprocal of the vehicle reference mass.

7. The system of claim 1 wherein the means for controlling vehicle braking comprises means for modifying the delivered braking pressure based on the relative vehicle mass.

8. For use with a vehicle including an electronic control unit with memory and a plurality of axles, each axle with an associated plurality of braking sites controlled by the electronic control unit, a method for determining a relative vehicle mass during a controlled braking maneuver for the purpose of braking control during subsequent braking maneuvers, the method comprising:

decelerating the vehicle at a predetermined rate during the controlled braking maneuver by delivering a braking pressure to each of the braking sites on at least one of the axles;

sampling the braking pressure delivered to the braking sites on the at least one of the axles to obtain at least one braking pressure signal;

determining the vehicle mass relative to a previously determined vehicle mass based on the at least one braking pressure signal; and controlling vehicle braking during subsequent braking maneuvers based on the relative vehicle mass.

9. The method of claim 8 wherein determining the vehicle mass comprises:

determining an estimated vehicle deceleration based on the at least one braking pressure signal and the previously determined vehicle mass;

sensing vehicle deceleration to obtain an actual vehicle deceleration signal;

comparing the estimated vehicle deceleration to the actual vehicle deceleration signal so as to generate an error signal;

modifying at least one of the braking pressures so as to reduce the error signal;

repeating the above two steps until the error signal is less than a predetermined value so as to obtain a steady-state estimated vehicle deceleration; and generating the vehicle mass based on the steady-state vehicle deceleration and the at least one braking pressure.

10. The method of claim 9 wherein determining an estimated vehicle deceleration comprises:

determining braking torques exerted by the plurality of braking sites located at each of the plurality of vehicle axles;

summing the braking torques exerted on each vehicle axle to generate a total vehicle braking torque;

processing the total vehicle braking torque to determine a vehicle braking force; and multiplying the vehicle braking force by the reciprocal of the vehicle reference mass.

11. For use with a tractor semi-trailer including an electronic control unit with memory and a plurality of axles, each axle with an associated plurality of braking sites controlled by the electronic control unit, a method for determining a relative tractor semi-trailer mass during a controlled braking maneuver for the purpose of braking control during subsequent braking maneuvers, the method comprising:

decelerating the tractor semi-trailer at a predetermined rate during the controlled braking maneuver by delivering a braking pressure to each of the braking sites on at least one of the axles;

sampling the braking pressure delivered to the braking sites on the at least one of the axles to obtain at least one braking pressure signal;

determining an estimated vehicle deceleration based on the at least one braking pressure signal and a previously determined tractor semi-trailer reference mass;

sensing tractor semi-trailer deceleration to obtain an actual tractor semi-trailer deceleration signal;

comparing the estimated tractor semi-trailer deceleration to the actual tractor semi-trailer deceleration signal so as to generate an error signal;

modifying at least one of the braking pressures so as to reduce the error signal;

repeating the above two steps until the error signal is less than a predetermined value so as to obtain a steady-state estimated tractor semi-trailer deceleration;

determining a tractor semi-trailer mass relative to the previously determined tractor semi-trailer mass based on the at least one braking pressure signal; and controlling tractor semi-trailer braking during subsequent braking maneuvers based on the relative tractor semi-trailer mass.

* * * * *